(12) United States Patent
Ohi et al.

(10) Patent No.: US 6,752,975 B2
(45) Date of Patent: Jun. 22, 2004

(54) COMBUSTION EXHAUST GAS TREATMENT PROCESS AND TREATMENT APPARATUS

(75) Inventors: Toshio Ohi, Kawasaki (JP); Yoshiharu Mizuno, Kawasaki (JP); Tatsuharu Arai, Kawasaki (JP); Koichi Nishimura, Kawasaki (JP); Tsunekichi Kuriyama, Kawasaki (JP); Yasuaki Toyomasu, Kawasaki (JP); Toshitaka Hiro, Kawasaki (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 10/089,524
(22) PCT Filed: Jul. 30, 2001
(86) PCT No.: PCT/JP01/06554
§ 371 (c)(1),
(2), (4) Date: Mar. 29, 2002
(87) PCT Pub. No.: WO02/09851
PCT Pub. Date: Feb. 7, 2002

(65) Prior Publication Data
US 2002/0155038 A1 Oct. 24, 2002

(51) Int. Cl.$^7$ ................................................ C01F 11/46
(52) U.S. Cl. ........................ 423/243.08; 423/242.1; 423/356

(58) Field of Search .............................. 423/210, 215.5, 423/235, 242.1, 243.06, 243.08, 545.6, 555.11, 356

(56) References Cited

FOREIGN PATENT DOCUMENTS

| JP | 58-174222 A | * 10/1983 | ............ 423/243.06 |
|----|----|----|----|
| JP | 4-74513 A | * 3/1992 | ............ 423/243.06 |
| JP | 05156268 A | 6/1993 | |
| JP | 06142447 A | 5/1994 | |
| JP | 10015344 A | 1/1998 | |
| JP | 2001-205044 A | 7/2001 | |

OTHER PUBLICATIONS

Grant et al. (Editors) Grant and Hackh's Chemical Dictionary (5th Ed.), p. 238; ISBN 0–07–024067–1, McGraw–Hill Book Co., 1987.*

* cited by examiner

Primary Examiner—Wayne A. Langel
(74) Attorney, Agent, or Firm—Sughrue Mion, PLLC

(57) ABSTRACT

Denitrated combustion exhaust gas is desulfurized with ammonia, the waste water obtained from washing the desulfurization waste water or dust ash is filtered using calcium carbonate, the pH of the filtrate is adjusted, carbon dioxide and/or aqueous carbonic acid is added and then a flocculating agent is added, and ammonia is recovered from the supernatant after precipitation and separation of the solid portion. The recovered ammonia is added to the denitrated gas for treatment of the combustion exhaust gas.

7 Claims, 2 Drawing Sheets

COMBUSTION EXHAUST GAS TREATMENT PROCESS AND TREATMENT APPARATUS

TECHNICAL FIELD

The present invention relates to a combustion exhaust gas treatment process and apparatus.

BACKGROUND ART

Exhaust gas treatment apparatuses for thermal power boilers are commonly equipped with denitration apparatuses designed to remove nitrogen oxides ($NO_x$), electric dust collectors designed to remove dust, and desulfurization apparatuses designed to remove sulfur oxides (mainly $SO_2$).

In cases where the thermal power boiler employs high-sulfur-containing heavy oils and petroleum coke as fuels, it is known that the exhaust gas contains $SO_2$ as well as $SO_3$ and/or sulfuric acid mist. The $SO_3$ and/or sulfuric acid mist contained in the exhaust gas cannot be easily removed with a desulfurization apparatus using calcium carbonate, and their removal has therefore been accomplished by injecting ammonia into the downstream exhaust gas of the denitration apparatus to convert it into harmless ammonium sulfate or ammonium hydrogen sulfate (hereunder also referred to as "acid ammonium sulfate"), which is then separated and removed with an electric dust collector and desulfurization apparatus.

The ammonia supplied to the downstream end of the denitration apparatus must be supplied in excess of the stoichiometric amount for complete removal of the $SO_3$ and/or sulfuric acid mist, and the unreacted ammonia supplied in excess is absorbed in the desulfurization apparatus at a later stage. Most of the ammonium sulfate or acid ammonium sulfate, as a reaction product of the $SO_3$ and/or sulfuric acid mist and ammonia, is removed by the electric dust collector at a later stage, and the unremoved ammonium sulfate or acid ammonium sulfate is absorbed at the desulfurization apparatus together with the unreacted ammonia. Thus, the waste water discharged from the desulfurization apparatus contains an abundant nitrogen portion in the form of ammonia, ammonium sulfate and acid ammonium sulfate, and without treatment, such waste water cannot be disposed of under the recently enforced waste water regulations.

The dust ash that has been separated and removed by the electric dust collector also contains ammonium sulfate and acid ammonium sulfate, and since the waste water used to wash this dust ash contains an abundant nitrogen portion in the form of ammonia, ammonium sulfate and acid ammonium sulfate, this waste water also cannot be disposed of under the current nitrogen waste water regulations, unless it is treated. It has therefore been the practice to reduce the nitrogen content of waste water to within regulation standards using a method in which the nitrogen portion is removed through denitration by biological treatment using nitrifying bacteria in the waste water treatment apparatus. However, the method of using nitrifying bacteria for biological treatment of the nitrogen portion dissolved in waste water poses the problem of a large treatment apparatus volume and increased equipment costs, making it necessary to reduce the amount of ammonia added for removal of the $SO_3$ and/or sulfuric acid mist.

In order to reduce the amount of ammonia used, it is desirable to recover and recycle ammonia from the ammonia-containing waste water of the ammonia-containing desulfurization apparatus and the ammonia-containing waste water used to wash the dust ash. However, after separation of the calcium sulfate produced upon desulfurization by the limestone-gypsum method employing calcium carbonate, the filtrate has a high Ca content, and when this waste water is introduced into an air heater or stripper for the ammonia recovery procedure, Ca precipitates in and blocks the evaporator or stripper, causing a problem which is prohibitive to prolonged continuous operation.

It has therefore become a common procedure that after the gypsum ($CaSO_4$) produced in the desulfurization waste water is separated by a filter, the pH is adjusted with an alkali metal hydroxide such as NaOH, and the Ca portion in the filtrate is precipitated and removed together with a coagulant. Still, the filtrate to which the coagulant has been added after pH adjustment for precipitation and separation usually contains at least 200 ppm of Ca, most of which is in the form of $Ca(OH)_2$. When this solution is supplied to an evaporator or stripper for heating, the trace amount of ammonium carbonate included therein releases carbonic acid, and the released carbonic acid reacts with the $Ca(OH)_2$ to precipitate calcium carbonate, thus creating a problem which prohibits prolonged continuous operation.

DISCLOSURE OF THE INVENTION

It is an object of the present invention, which has been accomplished under these circumstances, to provide a combustion exhaust gas treatment process and apparatus, employing a process for treatment of combustion exhaust gas in which the ammonia contained in waste water obtained after desulfurization or waste water used to wash dust ash is recovered, and the recovered ammonia is added to the denitrated gas.

As a result of diligent research aimed at achieving this object, the present inventors succeeded in completing the present invention upon finding that the aforementioned object can be achieved by removing ammonia from a supernatant obtained by filtering a solution which has been desulfurized using an aqueous solution containing calcium carbonate, adjusting the pH of the filtrate to 9–12 while simultaneously adding carbon dioxide and/or an aqueous carbonic acid solution, or else adjusting the pH to 9–12 after adding carbon dioxide and/or an aqueous carbonic acid solution, and then adding a flocculating agent to precipitate and separate a solid portion from the supernatant.

Thus, the present invention provides a combustion exhaust gas treatment process which comprises adding ammonia to denitrated combustion exhaust gas to convert $SO_3$ and/or sulfuric acid mist to ammonium sulfate and/or ammonium hydrogen sulfate, removing the produced ammonium sulfate and/or ammonium hydrogen sulfate with dust, desulfurizing the resulting gas using an aqueous solution containing calcium carbonate and filtering the solution to separate calcium sulfate and filtrate, and then adjusting the pH of the filtrate to 9–12 while simultaneously adding carbon dioxide and/or an aqueous carbonic acid solution, or else adjusting the pH to 9–12 after adding carbon dioxide and/or an aqueous carbonic acid solution, adding a coagulant to precipitate and separate a solid portion to form a supernatant, conducting the supernatant to a separately provided ammonia recovery step at which ammonia is recovered by introducing steam for distillation and concentration, and thereafter adding the recovered ammonia to the aforementioned denitrated gas.

The invention further provides a combustion exhaust gas treatment apparatus comprising at least an electric dust collector for removal of dust, a desulfurization apparatus employing calcium carbonate and a waste water treatment apparatus for treatment of the desulfurized waste water discharged from the desulfurization apparatus, the combustion exhaust gas treatment apparatus being constructed in such a manner that ammonia recovered from the desulfurized waste water using a waste water treatment apparatus comprising the following apparatuses (1) to (4) returns to the upstream end of the electric dust collector.

(1) A filtering apparatus for filtration of calcium sulfate.

(2) A pH adjusting apparatus provided with a function of supplying carbon dioxide and/or an aqueous carbonic acid solution.

(3) A precipitation and separation apparatus which precipitates and separates the solid portion after addition of the coagulant.

(4) A concentration apparatus which introduces steam into the supernatant obtained by precipitation and separation of the solid portion, and recovers the ammonia.

BEST MODE FOR CARRYING OUT THE INVENTION

Figure 1:
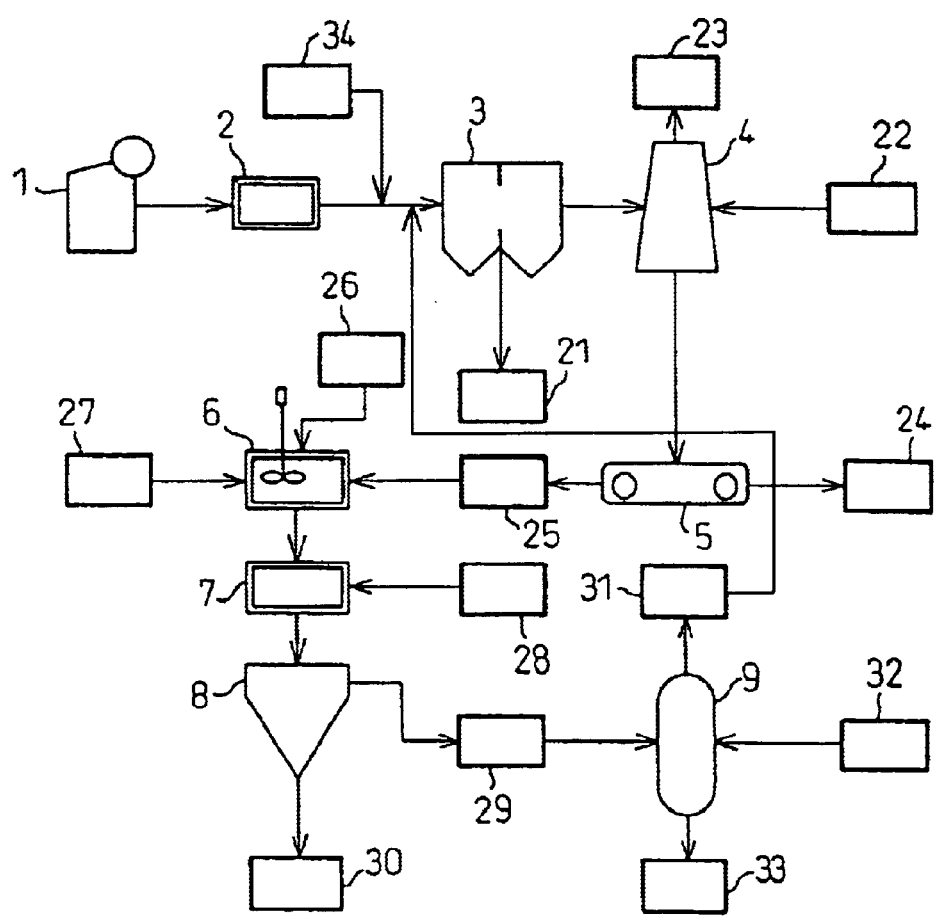
FIG. 1 is a schematic view illustrating an example of the combustion exhaust gas treatment process of the invention.

The combustion exhaust gas treatment process of the invention may be used for treatment of combustion exhaust gas discharged from boilers, for example, in which case ammonia is first added to the denitrated combustion exhaust gas to convert the $SO_3$ and/or sulfuric acid mist to ammonium sulfate and/or ammonium hydrogen sulfate, and the produced ammonium sulfate and/or ammonium hydrogen sulfate are removed out with the dust. This is then desulfurized using an aqueous solution containing calcium carbonate and the solution is then filtered to separate calcium sulfate and filtrate, the pH of the filtrate is adjusted to 9–12 while simultaneously adding carbon dioxide and/or an aqueous carbonic acid solution, or else the pH is adjusted to 9–12 after adding carbon dioxide and/or an aqueous carbonic acid solution, a flocculating agent is added so that the solid portion is precipitated and separated to form a supernatant. Then, the supernatant is conducted to a separately provided ammonia recovery step at which ammonia is recovered by introducing steam for distillation and concentration and the recovered ammonia is added to the denitrated gas.

The method used for denitration treatment of the boiler combustion exhaust gas is not particularly restricted, and for example, it may involve using ammonia in the presence of a catalyst for treatment of the $NO_x$ portion. After denitration, ammonia is added to convert the $SO_3$ and/or sulfuric acid mist to ammonium sulfate and/or ammonium hydrogen sulfate, and the ammonium sulfate and/or ammonium hydrogen sulfate produced by reaction between ammonia and $SO_3$ and/or sulfuric acid mist are collected with the dust. The gas from which most of the solid portion has been removed is then treated using an aqueous solution containing calcium carbonate for desulfurization.

After desulfurization, the produced gypsum ($CaSO_4$) is filtered out and an alkali metal hydroxide is used for adjustment of the pH of the filtrate to 9–12 while simultaneously adding carbon dioxide and/or an aqueous carbonic acid solution or else for adjustment of the pH to 9–12 after adding carbon dioxide and/or an aqueous carbonic acid solution, and a coagulant is added to precipitate and separate the Ca portion as calcium carbonate. As mentioned above, in conventional processes in which a coagulant is added after pH adjustment, the Ca portion still remains in an amount of about at least 200 ppm, but by employing the process of the invention wherein the pH of the filtrate is adjusted to 9–12 while simultaneously adding carbon dioxide and/or an aqueous carbonic acid solution or else the pH is adjusted to 9–12 after adding carbon dioxide and/or an aqueous carbonic acid solution, to convert the Ca portion to calcium carbonate, and a flocculating agent is further added for treatment, it is possible to reduce the Ca portion to under 5 ppm and thus prevent sedimentation of the Ca portion in the ammonia recovery step.

Furthermore, by adjusting the pH to 9–12 it is possible to establish a condition in which the Ca portion of the waste water is precipitated and separated as a carbonate while facilitating stripping of ammonia in the recovery step. The yield of ammonia in the recovery step can be adjusted by the amount of steam supplied, and the concentration of ammonia remaining in the waste water from the recovery step can be reduced to under 40 ppm.

The combustion exhaust gas treatment process of the invention may also be one wherein dust collected together with ammonium sulfate and/or ammonium hydrogen sulfate produced by addition of ammonia to the denitrated gas is mixed with water and heavy oil, the mixture is separated into the solid portion containing the dust and heavy oil and the aqueous solution containing ammonium sulfate and/or ammonium hydrogen sulfate, the pH of the aqueous solution is adjusted to 9–12, and then a flocculating agent is added, the solid portion is precipitated and separated and the supernatant is conducted to an ammonia recovery step. When the treatment process of the invention is used for treatment of boiler combustion exhaust gas, it may also employ the solid portion as fuel.

The combustion exhaust gas treatment apparatus of the invention is provided with at least an electric dust collector for removal of dust, a desulfurization apparatus employing calcium carbonate and a waste water treatment apparatus for treatment of the desulfurized waste water discharged from the desulfurization apparatus, and may be used for treatment of the $SO_3$ and/or sulfuric acid mist contained in combustion exhaust gas discharged from a boiler using ammonia, whereby ammonia is recovered from waste water from the desulfurization apparatus using a waste water treatment apparatus comprising (1) a filtering apparatus for filtration of calcium sulfate, (2) a pH adjusting apparatus provided with a function of supplying carbon dioxide and/or an aqueous carbonic acid solution, (3) a precipitation and separation apparatus which precipitates and separates the solid portion after addition of the coagulant and (4) a concentration apparatus which introduces steam into the supernatant obtained by precipitation and separation of the solid portion and recovers ammonia, and ammonia is returned to the upstream end of the electric dust collector. In the pH adjusting apparatus of (2), the filtrate obtained after filtration of the calcium sulfate is adjusted to a pH of 9–12, and the method used to accomplish this may be a method of adjusting the pH to 9–12 while simultaneously adding carbon dioxide and/or an aqueous carbonic acid solution, or a method of adjusting the pH to 9–12 after adding carbon dioxide and/or an aqueous carbonic acid solution.

Figure 2:
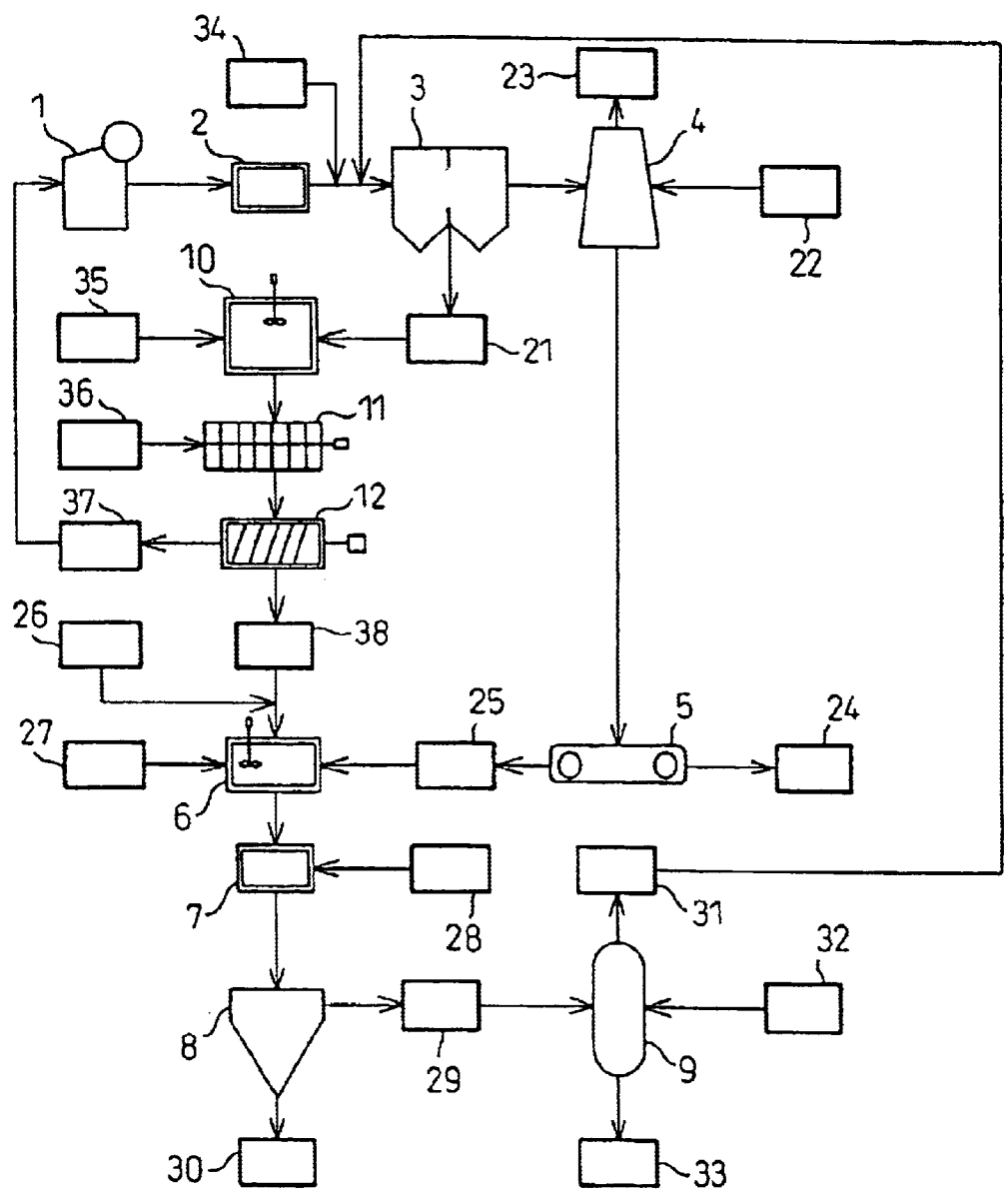
FIG. 2 is a schematic view illustrating another example of the combustion exhaust gas treatment process of the invention.

The combustion exhaust gas treatment process and treatment apparatus of the invention will now be explained with reference to the attached drawings. FIG. 1 and FIG. 2 are both outline schematic illustrations showing combustion exhaust gas treatment processes according to the invention for treatment of combustion exhaust gas discharged from a boiler, but the invention is not limited to these processes or apparatuses.

In FIG. 1, the combustion exhaust gas from a boiler 1 is first denitrated at a denitration apparatus 2, after which ammonia 34 and recovered ammonia 31 are supplied for removal of the $SO_3$ and/or sulfuric acid mist in the exhaust gas, whereby the $SO_3$ and/or sulfuric acid mist are converted to ammonium sulfate and/or acid ammonium sulfate. Here, the ammonia is supplied in a proportion of 2–2.5 with respect to the $SO_3$ and/or sulfuric acid mist. The ammonium sulfate and/or acid ammonium sulfate produced in the exhaust gas are sequestered at the electric dust collector 3 of the next stage as dust ash 21 along with the unburnt ash in the combustion exhaust gas. The exhaust gas from which the solid portion has been removed at the electric dust collector 3 contains unreacted ammonia that has been supplied in excess of the stoichiometric amount, and this exhaust gas is supplied to a desulfurization apparatus 4. At the desulfurization apparatus 4, calcium carbonate 22 is circulated as an absorbing agent to absorb the unreacted ammonia along with $SO_2$, and the inert portion of the exhaust gas is discharged as atmospheric escape gas 23. The absorption solution is supplied to a filtering apparatus 5 where the gypsum (calcium sulfate) 24 produced is separated and discharged out of the system, but the filtrate 25 is sent to an ammonia recovery system comprising a pH adjusting tank 6, a flocculation reaction tank 7, a precipitation/separation tank 8 and a stripper 9.

At the pH adjusting tank 6 of the ammonia recovery system, the pH is adjusted to 9–12 with an aqueous sodium hydroxide solution 26 to facilitate precipitation of the Ca portion of the filtrate 25 in the precipitation/separation tank 8. This pH condition not only facilitates precipitation and separation of the Ca but also facilitates dissipation of the ammonia in the stripper 9. A liquid containing an aqueous carbonic acid solution 27 is also supplied at the pH adjusting tank 6 for precipitation and separation of the Ca portion. The liquid leaving the pH adjusting tank 6 is supplied to the flocculation reaction tank 7 where it is mixed with a coagulant 28. The liquid leaving the flocculation reaction tank 7 is supplied to the precipitation/separation tank 8, where salts including calcium carbonate and heavy metals are precipitated and separated, and are discharged from the bottom of the precipitation/separation tank 8 out of the system as solids 30. Next, the supernatant 29 is supplied to the stripper 9, and steam 32 is blown in from the bottom of the stripper 9, ammonia 31 is recovered as an aqueous solution at the top of the stripper column while ammonia is also removed from the bottom of the column and the nitrogen portion is discharged out of the system as waste water 33 meeting waste water regulations.

As explained above, a stoichiometric excess of ammonia is supplied for removal of the $SO_3$ and/or sulfuric acid mist contained in the gas discharged from the denitrating apparatus 2; however, the ammonia is not discharged into the atmosphere from the desulfurization apparatus 4 but is absorbed in the desulfurizing circulation liquid. The calcium sulfate produced in the desulfurizing circulation liquid is filtered out, and then the treatment process of the invention may be used to continuously recover ammonia by reducing the Ca concentration to under 5 ppm, thus allowing the recovered ammonia to be recycled for removal of $SO_3$ and/or sulfuric acid mist, whereby the amount of fresh ammonia supply may be reduced and the process may thus be rendered more economical. The waste water discharged out of the system from the bottom of the stripper at the same time also sufficiently clears waste water regulations.

In FIG. 2, which shows a situation similar to FIG. 1, combustion exhaust gas from the boiler 1 is denitrated at the denitration apparatus 2, after which the $SO_3$ and/or sulfuric acid mist in the exhaust gas using ammonia 34 and recovered ammonia 31, and the produced ammonium sulfate and/or acid ammonium sulfate are sequestered at the electric dust collector 3 as dust ash 21 along with the unburnt ash in the combustion exhaust gas. The dust ash 21 containing ammonium sulfate and/or acid ammonium sulfate is conducted to a mixing tank 10 and mixed with water 35.

The mixing tank 10 is provided with a stirrer, and the mixture of dust ash 21 and water 35 is sent to an ash granulator 11 for mixture with a binder (heavy oil) 36 and granulation of the ash into a form suitable for supply to the boiler. The granulated ash 37 is then sent to a water separator 12 for separation of the water, and after separating the granulated ash 37 and water 38, the granulated ash 37 is recycled as boiler fuel. The water 38 contains ammonia and ammonium sulfate and/or acid ammonium sulfate, and a coagulant 28 is added upon adjustment to a pH of 9–12, after which the solid portion is precipitated and separated and the supernatant is sent to an ammonia recovery system.

The present invention will now be explained in further detail by way of the following example which is not, however, intended to restrict the invention in any way.

EXAMPLE 1

To denitrated exhaust gas containing $SO_3$ and/or sulfuric acid mist at about 100 vol ppm (based on dry gas) there was supplied ammonia in an amount corresponding to 2–2.5 times the molar amount of the $SO_3$ and/or sulfuric acid mist. The unreacted ammonia was about 50 vol ppm (based on dry gas). Most of the $SO_3$ and/or sulfuric acid mist that reacted with the ammonia was converted to ammonium sulfate or acid ammonium sulfate, and these were removed with the dust.

The exhaust gas containing the unreacted ammonia was conducted to a slurry-like calcium carbonate aqueous solution to convert the $SO_2$ to gypsum, while the unreacted ammonia was absorbed in a circulating absorption solution. The $SO_3$ and/or sulfuric acid mist in the atmospheric exhaust gas discharged after desulfurization was about 2 vol ppm (based on dry gas).

A portion of the absorption solution used for desulfurization was then extracted and the produced gypsum was filtered out. This extracted solution contained ammonia at about 9000 ppm, and after removal of the gypsum, the pH of the filtrate was adjusted to 10–12 with an aqueous sodium hydroxide solution. The pH-adjusted solution contained Ca at about 300 ppm, and since this can cause blockage when supplied to a stripper unless the content is reduced, an aqueous carbonic acid solution was supplied to convert the Ca to calcium carbonate. The aqueous carbonic acid solution was supplied here in an amount corresponding to 10 times the amount of Ca. When this solution was mixed with a flocculating agent to precipitate the solid portion, the Ca contained in the supernatant was reduced to under 5 ppm. After heating the supernatant in a heat exchanger, it was supplied to the ammonia recovery step.

The conditions for ammonia recovery were in the range of ordinary pressure to 0.1 kg/cmG, and an aqueous ammonia solution with an ammonia content of 5–8 wt % was recovered. After gasifying the recovered ammonia, it was supplied to the denitrated gas for removal of the $SO_3$ and/or sulfuric acid mist.

As a result, it was possible to reduce the amount of ammonia supplied from outside, while the ammonia in the discharged atmospheric exhaust gas was under 1 vol ppm and the ammonia nitrogen in the waste water discharged to the outside was under 40 ppm.

Industrial Applicability

As explained above, by adjusting the pH of denitrated waste water and supplying carbon dioxide and/or an aqueous carbonic acid solution in an exhaust gas treatment procedure in which ammonia is supplied to remove $SO_3$ and/or sulfuric acid mist contained in combustion exhaust gas, it is possible to remove the dissolved Ca portion as calcium carbonate and thus allow continuous operation of the stripper without causing blockage due to sedimentation of Ca in the stripper. In addition, the ammonia can be recovered from the column top and recycled for removal of the $SO_3$ and/or sulfuric acid mist in order to reduce the amount of ammonia necessary for use and produce treatment waste water from the column bottom which clears nitrogen content regulations.

What is claimed is:

1. A combustion exhaust gas treatment process which comprises adding ammonia to denitrated combustion exhaust gas to convert $SO_3$ and/or sulfuric acid mist to ammonium sulfate and/or ammonium hydrogen sulfate, removing the produced ammonium sulfate and/or ammonium hydrogen sulfate with dust, desulfurizing the resulting gas using an aqueous solution containing calcium carbonate, filtering the aqueous solution from the desulfurization step to separate calcium sulfate from the filtrate, and then adjusting the pH of the filtrate to 9–12 while simultaneously adding carbon dioxide and/or an aqueous carbonic acid solution, or else adjusting the pH to 9–12 after adding carbon dioxide and/or an aqueous carbonic acid solution, adding a flocculating agent to the pH adjusted filtrate to precipitate a solid portion and separating the solid portion to form a supernatant, conducting the supernatant to a separate ammonia recovery step at which ammonia is recovered by introducing steam for distillation and concentration, and thereafter adding the recovered ammonia to the aforementioned denitrated gas.

2. The process of claim 1, wherein the combustion exhaust gas is combustion exhaust gas from a boiler.

3. The process of claim 1 or 2, wherein the removed ammonium sulfate and/or ammonium hydrogen sulfate together with the dust is mixed with water and heavy oil, the mixture is separated into the solid portion containing the dust and heavy oil and the aqueous solution containing ammonium sulfate and/or ammmonium hydrogen sulfate, the pH of the aqueous solution is adjusted to 9–12, and then a coagulant is added, the solid portion is precipitated and separated and the supernatant is conducted to the ammonia recovery step.

4. The process of claim 1 or 2, wherein the Ca concentration of the supernatant conducted to the ammonia recovery step is no greater than 5 ppm.

5. The process of claim 1 or 2, wherein the ammonia concentration in the waste water which has been conducted to the ammonia recovery step and has had ammonia recovered is no greater than 40 ppm.

6. The process of claim 3, wherein the waste water discharged from the ammonia recovery step has an ammonia content of no greater than 40 ppm.

7. The process of claim 4, wherein the waste water discharged from the ammonia recovery step has an ammonia content of no greater than 40 ppm.

* * * * *